United States Patent Office 3,385,706
Patented May 28, 1968

3,385,706
PHOTOGRAPHIC MATERIAL FOR THE SILVER DYESTUFF BLEACHING PROCESS
Rudolf Mory, Dornach, and Alfred Oetiker, Basel, Switzerland, assignors to Ciba Limited, Basel, Switzerland, a Swiss company
No Drawing. Filed Feb. 2, 1965, Ser. No. 429,891
Claims priority, application Switzerland, Mar. 19, 1964, 3,565/64
7 Claims. (Cl. 96—99)

ABSTRACT OF THE DISCLOSURE

Photographic materials for the silver dyestuff bleaching process, containing in at least one layer at least one dyestuff of the formula (1) 

in which $R_1$ is a benzene radical and $R_2$ and $R_3$ each are a monocyclic benzene radical; $R_3$ is bound to the azo groups in 1:4-position and contains two substituted or unsubstituted alkoxy groups, one group being bound to $R_3$ in 2-position and one in 5-position and $R_4$ is the radical of an 8-hydroxynaphthalene disulfonic acid bound to the azo group in 7-position, which radical contains a substituted amino group in 1-position.

---

The present invention provides photographic materials for the silver dyestuff bleaching process, which materials contain in at least one layer at least one dyestuff of the formula (1) 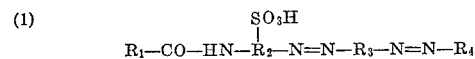

in which $R_1$ represents a benzene radical and $R_2$ and $R_3$ each represents a monocyclic benzene radical; $R_3$ is bound to the azo groups in 1:4-position and contains two substituted or unsubstituted alkoxy groups, one group being bound to $R_3$ in 2-position and one in 5-position and $R_4$ represents the radical of an 8-hydroxynaphthalene disulfonic acid bound to the azo group in 7-position, which radical contains a substituted amino group in 1-position.

Dyestuffs of Formula 1 may be obtained by coupling a diazo compound of an amine of the formula (2) 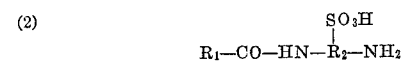

in which $R_1$ and $R_2$ have the meanings given above with a 1-amino-2:5-dialkoxybenzene, diazotizing the aminomonoazo dyestuff of the formula (3) 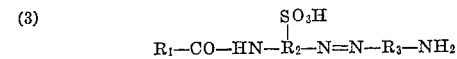

thus obtained and coupling the diazoazo compound in a position vicinal to the hydroxyl group with an 8-hydroxynaphthalene disulfonic acid that contains a substituted amino group in 1-position.

The benzene radical $R_2$ of amines of the Formula 2 may contain the sulfonic acid group, the $NH_2$— group and the $R_1$—CO—HN— group, for example, in 1,3,6-position or in 1,2,5-position, but preferably in 1,2,4-position. The radical $R_2$ and especially the radical $R_1$ may contain further substituents, but cyclic substituents may be present in radical $R_1$ only. Examples of such substituents are halogen atoms, for example, chlorine; alkyl groups, for example, a methyl group; and alkoxy groups, for example, ethoxy or methoxy groups. The 2-amino-4-acylamino-benzene-1-sulfonic acids advantageously correspond to the formula (4) 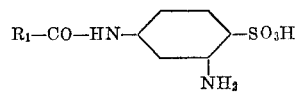

in which $R_1$ has the meaning given above.

The 1-amino-2:5-dialkoxybenzenes to be coupled with the diazo compounds of the amines of the Formulas 2 or 4 advantageous contain no substituents in addition to alkoxy groups having not more than two carbon atoms each. The alkoxy groups may contain hydroxyl groups as substituents.

The 8-hydroxynapthalene disulfonic acids having a substituted amino group in 1-position to be used as end components in the manufacture of the disazo dyestuffs of the Formula 1 advantageously contain the sulfonic acid groups in 3:6- or 4:6-position. The amino group in 1-position may be substituted, for example, by alkyl groups, for example, ethyl or methyl groups, or by benzene radicals that may themselves be further substituted, or by cycloalkyl radicals, for example, a cyclohexyl radical, or preferably by acyl radicals. The acyl radicals may be derived from carboxylic acid groups or sulfonic acid groups, especially those of the benzene series, in which case, too, the benzene nuclei may contain further substituents, for example, chlorine atoms, alkyl groups or additional acylamino groups.

A number of compounds suitable for use as starting materials in the synthesis of the dyestuffs of the Formula 1 are listed below:

Amines of the Formula 2: 2-amino-4-benzoylaminobenzene-1-sulfonic acid, 2-amino-4-(4'-chlorobenzoylamino)-benzene-1-sulfonic acid, 2-amino-4-(4'-methoxybenzoylamino)-benzene-1-sulfonic acid, 3-amino-6-benzoylaminobenzene-1-sulfonic acid and 2-amino-5-benzoylaminobenezene-1-sulfonic acid.

1-amino-2:5-dialkoxybenzenes: 1 - amino-2:5 - dimethoxybenzene, 1-amino-2:5-diethoxybenzene, 1-amino-2-methoxy-5-ethoxybenzene and 1-amino-2-ethoxy-5-methoxybenzene.

End components: 1 - phenylamino-8-hydroxynaphthalene-3:6-disulfonic acid, 1-phenylamino-8-hydroxynaphthalene - 4:6 - disulfonic acid, 1-cyclohexylamino-8-hydroxynaphthalene-3:6-disulfonic acid, 1-cyclohexylamino-8-hydroxynaphthalene-4:6-disulfonic acid, 1-benzoylamino-8-hydroxynaphthalene-3:6-disulfonic acid, 1-benzoylamino-8-hydroxynaphthalene - 4:6 - disulfonic acid, 1-(2':4'-dichlorobenzoylamino) - 8 - hydroxynaphthalene-3:6-disulfonic acid, 1-(3'-acetylaminobenzoylamino)-8-hydroxynaphthalene-3:6-disulfonic acid, 1-(4'-chlorobenzoylamino)-8-hydroxynaphthalene-4:6-disulfonic acid, 1-(4'-methylbenzenesulfonylamino) - 8 - hydroxynaphthalene-3:6-disulfonic acid and 1-(4'-methylbenzenesulfonylamino)-8-hydroxynaphthalene-4:6-disulfonic acid.

From the foregoing it can be seen that azo dyestuffs of the following formulae are to be preferably used in the present invention:

(5) 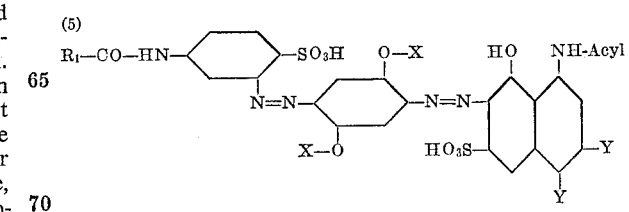

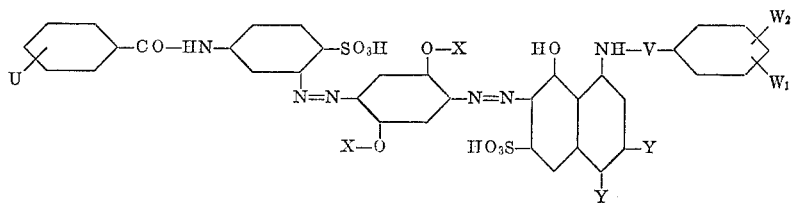

In the above formulae $R_1$ represents a benzene radical, X represents an alkyl group containing not more than 2 carbon atoms, one of the two symbols Y bound to the same naphthalene ring represents a hydrogen atom and the other represents a sulfonic acid group, U represents a hydrogen atom, a chlorine atom or a methoxy group, V represents a —CO— group or an —SO$_2$— group, and $W_1$ and $W_2$ represent hydrogen atoms, chlorine atoms, methyl, methoxy or acylamino groups.

The disazo dyestuffs of the Formulae 1, 5 and 6 may be prepared by the usual methods. For example, diazo compounds of amines of the Formula 2 may be coupled with the 1-amino-2:5-dialkoxybenzenes, advantageously in a weakly acid medium, whereas the diazoazo compounds may be coupled with the end components in an alkaline medium, if desired or required, in the presence of agents that assist coupling, for example, ethanol, or pyridine bases, for example, pyridine itself or picoline.

In accordance with the invention, the said dyestuffs are present in photographic layers for the silver dyestuff bleaching process. These materials may have the usual composition and can be prepared in known manner. Silver halide emulsion layers colored with these green-blue dyestuffs can advantageously be sensitized to red light and form part of multilayer material suitable for the production of colored images to be viewed in incident light, which material also contains at least one magenta layer sensitized to green light and a yellow layer sensitive to blue light, and further layers that do not, however, contain image dyestuffs. Gelatine layers colored with dyestuffs of the Formula 1 display pure tints and have absorption curves that are advantageous in photographic work.

A method of manufacturing a dyestuff of the Formula 1 is described hereafter. Unless otherwise stated, the parts and percentages in the said manufacturing process and the example that follows are by weight.

Manufacturing process 29.2 parts of 2-amino-4-benzoylaminobenzene-1-sulfonic acid are diazotized in the usual manner with hydrochloric acid and sodium nitrite. 15.3 parts of 2:5-dimethoxy-1-aminobenzene are dissolved in 200 parts of water and 12 parts by volume of 37% hydrochloric acid and coupled with the diazo suspension. The hydrochloric acid reaction mixture is buffered by the addition of sodium acetate, and the batch stirred for 16 hours at 0 to 10° C. It is then again rendered acid to congo paper by the addition of hydrochloric acid and heated to 35° C. The dyestuff is isolated by filtration, washed with 500 parts by volume of 2% hydrochloric acid and dried. 45 parts of a brick red powder are obtained.

19 parts of naphthalene are dissolved in 26.7 parts of 98% sulfuric acid. The solution is diluted with water to 100 parts by volume, 4.6 parts of the aminoazo dyestuff followed by 3 parts by volume of 4 N sodium nitrite solution are added and the whole stirred for 16 hours at 0 to 5° C. Then 1 part by volume of 4 N sodium nitrite solution is added and the batch stirred for a further 4 hours at room temperature. Subsequently, the excess of nitrite is destroyed with sulfamic acid. The diazo suspension is added to a solution of 4.9 parts of 1-(2':4'-dichlorobenzoylamino)-8-hydroxynaphthalene - 3:6-disulfonic acid and 60 parts of sodium carbonate in 250 parts by volume of water followed by 20 parts by volume of picoline and the whole stirred at room temperature for 16 hours. The dyestuff is then isolated by filtration and purified by washing with dilute sodium hydroxide solution. It is stirred in water, the pH adjusted to 7 by the addition of acetic acid, the dyestuff precipitated by the addition of sodium acetate, isolated by suction filtration and then thoroughly washed with ethyl alcohol. After drying, 4.3 parts of a black-violet powder are obtained. The dyestuff has the formula

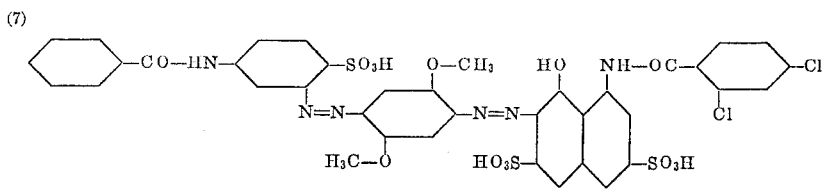

and an absorption maximum of 625 m$\mu$, determined by measurement on a sheet of gelatine containing the dyestuff.

The following example illustrates the invention:

Example

A red sensitizer and the usual additives, for example, stabilizers, wetting agents and hardening agents, are added at 40° C. to 1 kg. of a highly sensitive silver iodobromide emulsion having a gelatine content of 8%. Then 500 ml. of a 0.7% aqueous solution of the green-blue dyestuff of the Formula 7 are heated to 50° C. and likewise stirred into the emulsion. The emulsion is then filtered and adjusted to the requisite viscosity by the addition of water. A layer 6$\mu$ thick (when dry) is then produced on baryta paper weighing 190 grams per square meter by casting at a rate of 6 m./min. and at a temperature of 40° C.

This layer can also form part of a multilayer material and is suitable for the production of green-blue images or the green-blue portion of multicolor images by the silver dyestuff bleaching process.

Photographic layers for the silver dyestuff bleaching process can also be produced in the same manner with the dyestuff made from the components listed in the following table as well as with the dyestuff of the Formula 7. Column I contains the diazo components, Column II the first coupling components and Column III the second coupling components. Column IV shows the absorption maxima, which were determined by measurement on a sheet of colored gelatine. The dyestuffs are advantageously prepared by the method described above for the dyestuff of the Formula 7.

TABLE

| | I | II | III | IV, mμ |
|---|---|---|---|---|
| 1 | 2-amino-4-benzoylaminobenzene-1-sulfonic acid | 2:5-dimethoxy-1-aminobenzene | 1-benzoylamino-8-hydroxynaphthalene-4:6-disulfonic acid. | 650 |
| 2 | 2-amino-4-(4'-chlorobenzoylamino)-benzene-1-sulfonic acid | do | do | 605–640 |
| 3 | do | do | 1-(2':4'-dichlorobenzoylamino)-8-hydroxynaphthalene-3:6-disulfonic acid. | 615 |
| 4 | do | do | 1-benzoylamino-8-hydroxynaphthalene-3:6-disulfonic acid. | 590 |
| 5 | do | 2:5-diethoxy-1-aminobenzene | 1-(4'-chlorobenzoylamino)-8-hydroxynaphthalene-4:6-disulfonic acid. | 620 |
| 6 | do | 2:5-dimethoxy-1-aminobenzene | do | 605–640 |
| 7 | 2-amino-4-benzoylaminobenzene-1-sulfonic acid | do | 1-(4'-acetylaminobenzoylamino)-8-hydroxynaphthalene-4:6-disulfonic acid. | 620–670 |
| 8 | do | do | 1-(4'-acetylaminobenzoylamino)-8-hydroxynaphthalene-3:6-disulfonic acid. | 590 |
| 9 | do | do | 1-(3'-acetylaminobenzoylamino)-8-hydroxynaphthalene-3:6-disulfonic acid. | 608 |
| 10 | 2-amino-4-(4'-methoxybenzoylamino)-benzene-1-sulfonic acid | do | 1-benzoylamino-8-hydroxynaphthalene-4:6-disulfonic acid. | 592 |

What is claimed is:

1. Photographic material for the silver dyestuff bleaching process which comprises a silver halide emulsion layer containing at least one dyestuff of the formula

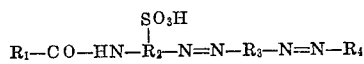

in which $R_1$ represents a benzene radical, $R_2$ and $R_3$ each represents a monocyclic benzene radical, $R_3$ is bound to the azo groups in 1:4-position and contains two alkoxy groups, one being bound to $R_3$ in 2-position and one in 5-position, and $R_4$ represents

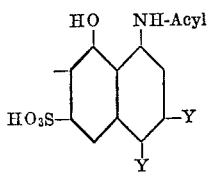

wherein one Y represents a hydrogen atom and the other Y represents a sulfonic acid group.

2. Photographic material for the silver dyestuff bleaching process which comprises a silver halide emulsion layer containing at least one dyestuff of the formula

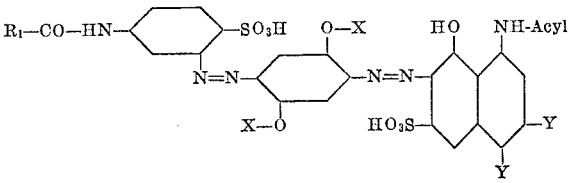

in which $R_1$ represents a benzene radical, X represents an alkyl group containing at most 2 carbon atoms, one Y represents a hydrogen atom and the other Y represents a sulfonic acid group.

3. Photographic material for the silver dyestuff bleaching process which comprises a silver halide emulsion layer containing at least one dyestuff of the formula

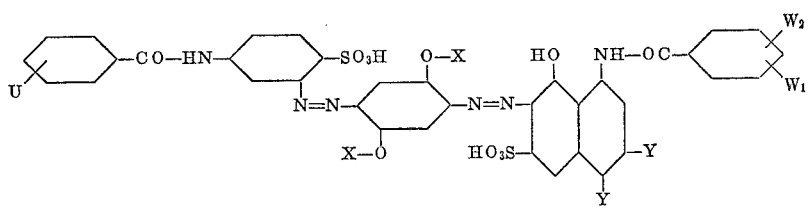

in which U represents a member selected from the group consisting of a hydrogen atom, a chlorine atom and a methoxy group, $W_1$ represents a member selected from the group consisting of a hydrogen atom, a chlorine atom and an acetylamino group, $W_2$ represents a member selected from the group consisting of a hydrogen atom and a chlorine atom, one Y represents a hydrogen atom and the other Y represents a sulfonic acid group.

4. Photographic material for the silver dyestuff bleaching process which comprises a silver halide emulsion layer containing the dyestuff of the formula

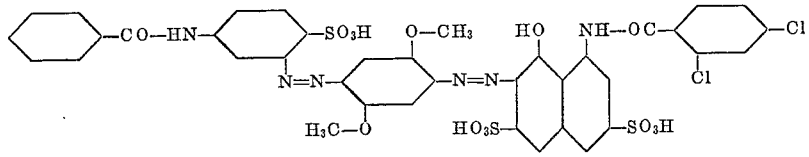

5. Photographic material for the silver dyestuff bleaching process which comprises a silver halide emulsion layer containing the dyestuff of the formula

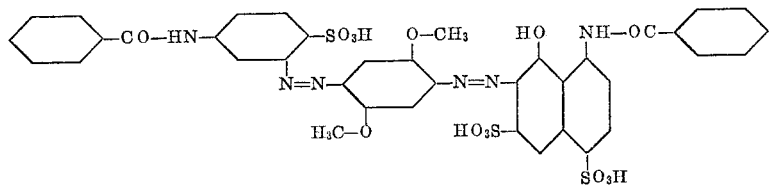

6. Photographic material for the silver dyestuff bleaching process which comprises a silver halide emulsion layer containing the dyestuff of the formula

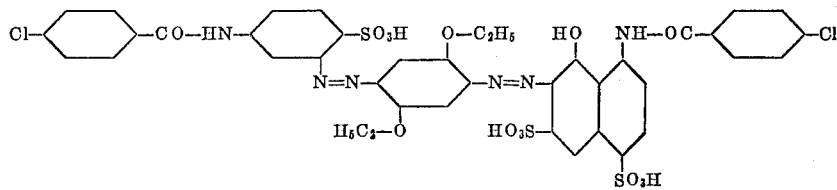

7. Photographic material for the silver dyestuff bleaching process which comprises a silver halide emulsion layer containing the dyestuff of the formula

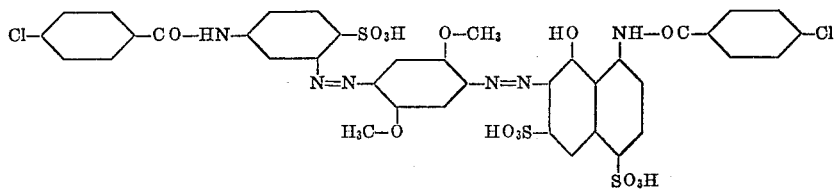

References Cited

UNITED STATES PATENTS

| 3,117,962 | 1/1964 | Rohland et al. | 8—41 |
| 3,123,596 | 3/1964 | Eltonhead | 8—41 |
| 3,157,508 | 11/1964 | Dreyfuss | 96—99 |

J. TRAVIS BROWN, *Primary Examiner.*